(12) United States Patent
Hachenberg et al.

(10) Patent No.: US 9,493,224 B2
(45) Date of Patent: Nov. 15, 2016

(54) CONNECTION ARRANGEMENT AND STRUCTURE

(71) Applicant: Airbus Operations GmbH, Hamburg (DE)

(72) Inventors: Dieter Hachenberg, Hamburg (DE); Lars Margull, Hamburg (DE); Dieter Kohlgrueber, Hamburg (DE); Matthias Waimer, Hamburg (DE); Harald Kraft, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 170 days.

(21) Appl. No.: 14/555,618

(22) Filed: Nov. 27, 2014

(65) Prior Publication Data

US 2015/0151829 A1    Jun. 4, 2015

(30) Foreign Application Priority Data

Dec. 3, 2013   (DE) .................. 10 2013 113 393

(51) Int. Cl.
  *B64C 1/06*   (2006.01)
  *B64C 1/18*   (2006.01)
  *F16F 7/08*   (2006.01)
  *F16F 7/12*   (2006.01)

(52) U.S. Cl.
  CPC .............. *B64C 1/062* (2013.01); *B64C 1/18* (2013.01); *F16F 7/08* (2013.01); *F16F 7/127* (2013.01)

(58) Field of Classification Search
  CPC ............ F16F 7/12; F16F 1/125; F16F 1/128; B64C 1/062; B64C 1/18
  See application file for complete search history.

(56) References Cited

U.S. PATENT DOCUMENTS

| | | |
|---|---|---|
| 2004/0231937 A1 | 11/2004 | Goodworth et al. |
| 2008/0078129 A1 | 4/2008 | Wood et al. |
| 2010/0243803 A1 | 9/2010 | Westre et al. |
| 2011/0042513 A1 | 2/2011 | Milliere et al. |

FOREIGN PATENT DOCUMENTS

| | | |
|---|---|---|
| DE | 19925953 | 9/2000 |
| DE | 102007014464 | 10/2008 |
| DE | 102010027859 | 10/2011 |

(Continued)

OTHER PUBLICATIONS

German Search Report, Dec. 3, 2013.
(Continued)

*Primary Examiner* — Philip J Bonzell
(74) *Attorney, Agent, or Firm* — Greer, Burns & Crain Ltd.

(57) ABSTRACT

An energy-absorbing connection arrangement with a multitude of connectors for joining two components, such as a transverse member and a circular frame element, of an aircraft fuselage. Each connector comprises a headed shaft and the shafts reach through component boreholes. On the shaft ends facing away from the heads, counter-bearings are provided. At least one of the components comprises a fiber-reinforced plastic material. A head and/or counter-bearing of at least one connector rests against at least one underlay device. The underlay device is received in a guide groove in the first component, with the guide groove commencing in the region of the boreholes. The underlay device, upon exceeding a mechanical threshold load, is slidable away from the boreholes. Energy absorption takes place along a longitudinal center axis of the guide groove as a result of hole-bearing-stress failure and/or the shearing of the fiber-reinforced plastic material component.

18 Claims, 9 Drawing Sheets

(56) References Cited

FOREIGN PATENT DOCUMENTS

| DE | 102011119251 | 5/2013 |
| EP | 1467114 | 10/2004 |
| WO | 2009101372 | 8/2009 |
| WO | 2011073315 | 6/2011 |

OTHER PUBLICATIONS

European Search Report, Mar. 18, 2015.

CONNECTION ARRANGEMENT AND STRUCTURE

CROSS-REFERENCES TO RELATED APPLICATIONS

This application claims the benefit of the German patent application No. 10 2013 113 393.2 filed on Dec. 3, 2013, the entire disclosures of which are incorporated herein by way of reference.

BACKGROUND OF THE INVENTION

The invention relates to an energy-absorbing connection arrangement for joining at least two components, in particular a transverse member and a circular frame element of a fuselage cell structure of an aircraft wherein the connection arrangement comprises a multitude of connectors that are, in particular, arranged in a matrix-like manner, wherein each connector comprises a head with a shaft, and the shafts reach through associated boreholes in the components, and on the shaft ends facing away from the heads in each case counter-bearings are provided, and a first component comprising a fiber-reinforced plastic material and at least one further component comprising a metallic material and/or comprising a fiber-reinforced plastic material are formed. Furthermore, the invention relates to a structure with at least two components joined by means of such a connection arrangement.

Fuselage cell structures for aircraft, which fuselage cell structures comprise CFRP-components (CFRP=Carbon Fiber Reinforced Plastic) as a rule require additional local crash absorbers in order to achieve a crash behavior that is comparable to that of aircraft produced in the conventional all-metal construction. However, such crash absorbers very considerably increase the weight and the complexity of the entire primary structure of the aircraft. The rivet connections and/or bolt connections that are necessary anyway for joining the CFRP-components to form a fuselage cell structure are an alternative option for energy absorption. Apart from their actual load-bearing function within the primary structure, these rivet connections and/or bolt connections can be used in an advantageous manner in addition to energy absorption as a result of hole-bearing failure. The hole-bearing failure typical of CFRP-components shows a very considerable mass-specific energy absorption potential as well as advantageous force-distance characteristics with an almost constant force level and with high upsetting-force efficiency.

However, in this context, generating a robust process of hole-bearing failure, which process at the same time can be reliably initiated and flows in a controlled manner, creates difficulties. Furthermore, as a rule, in conventional rivet connections and/or bolt connections, hole-bearing failure occurs in a spatial orientation that is determined by the angle of the lowest laminate strength and by the angles of the direction of the load application.

Moreover, in the case of conventional rivet connections and/or bolt connections there is the danger of the so-called head-pull resistance and associated with it the total failure of the entire structural connection. Furthermore, there is the possibility of an uncontrolled increase in force as a result of jammed or blocked fragments or displaced laminate.

From DE 10 2007 014 464 A1 a mechanical absorption device for crash situations is known. This device comprises an energy absorber plate supported on a component, and a suspension component supported on another component, with an engagement component designed as a pin. The pin engages a recess in the energy absorber plate and is supported on said energy absorber plate. In a crash situation, in other words in the case of a high deceleration force acting on the components, for energy absorption the energy absorber plate can be slit open, by means of the pin of the suspension component, by a relative movement between the energy absorber plate and the suspension component. This device is associated with a disadvantage in that an additional component is required in order to, in the case of a crash, convert the movement energy to some other form of energy, and consequently the weight and the complexity of the structure are increased.

SUMMARY OF THE INVENTION

It is thus an object of the invention to create a largely weight-neutral connection arrangement for joining in particular at least two composite-fiber-reinforced components, for example CFRP-components, which connection arrangement, comprises a safely initiatable and adequately high energy absorption capacity that is reliably controllable in all phases for absorbing extreme mechanical loads, as can, for example, occur in the case of a crash of an aircraft. Furthermore, it is an object of the invention to create a structure comprising at least two joined components, which structure in the case of overload provides very considerable energy absorption.

According to the invention a head and/or a counter-bearing of at least one connector rests against at least one underlay device, and the at least one underlay device is received in at least one guide groove embedded at least in the first component, with commencement of the guide groove being in the region of the boreholes, wherein as a result of exceeding a mechanical threshold load Fthreshold the at least one underlay device is slidable in a direction facing away from the boreholes, and energy absorption takes place essentially along a longitudinal center axis of the at least one guide groove, in particular as a result of hole-bearing failure and/or shearing-off of the at least one component formed by means of the fiber-reinforced plastic material.

In this manner, in the case of a previously precisely defined mechanical threshold load, for example as can occur during a hard landing of an aircraft without landing gear on a runway, the connection arrangement can absorb mechanical energy to a considerable extent so that the consequences of exceeding the threshold load in this manner reduces acceleration forces, and the mechanical cohesion of the components through the connection arrangement, or the integrity of the entire fuselage cell structure, remains largely intact. Preferably, the connection arrangement is used for connecting CFRP-transverse members to CFRP-circular frame elements within a fuselage cell structure. In this arrangement the CFRP-circular frame elements in turn are clad by means of a CFRP-fuselage cell skin. The connection arrangement preferably comprises a multitude of connector rows that extend parallel to each other and that together form a so-called connector field or a so-called connector matrix. The underlay devices among other things prevent any pulling of the heads of the connectors through the first component so as to ensure the cohesion of the components under all the load conditions that occur. The energy absorption of the connection arrangement essentially takes place in the axial direction of the guide groove. Consequently the guide groove extends parallel to a principal load direction. Experiments have shown energy absorption by way of the connection arrangement, or of the connection arrangement, essentially in the axial direction of the guide groove with a load introduction angle α of up to 30°. In other words, energy absorption in the transverse direction of the fuselage takes place even in those cases in which energy absorption is introduced into the guide groove obliquely to the transverse direction of the fuselage. It should be pointed out that the specifying angular range should not be interpreted as being limiting; instead it is merely of an exemplary nature. The boreholes in the first component are in each case situated in the region of commencement of the guide groove of the respectively associated guide groove. It should be pointed out that the arrangement of the connectors in the boreholes can also be effected the other way round (overhead); in other words the counter-bearing rests against the underlay device, and the head rests against the underside of the second component under mechanical preload.

Apart from at least the first component comprising any fiber-reinforced plastic, in particular, however, comprising CFRP, at least one further component, joined to the aforesaid component by way of the connection arrangement, can also comprise any fiber-reinforced plastic material and/or a metallic material, in particular aluminum, titanium or stainless steel.

According to an advantageous embodiment of the connection arrangement, it is provided that a receiving groove is embedded, in the region of the guide groove, in the at least one guide groove and/or in the region of an underside of the first component, which underside faces the second component. By means of the aforesaid, component material (laminate) displaced by the shaft of the at least one connector can be received so that any blocking of the movement process and any consequent pulling-off of connectors, and thus total failure of the connection arrangement, are prevented.

In an advantageous improvement of the connection arrangement it is provided for the connectors to be designed as rivets and/or threaded bolts with nuts as counter-bearings. By this means, for the crash-safe connection arrangement it is possible to use connectors of an identical or similar design that are commonly used in the aviation industry.

In a further embodiment at least one connector is positioned outside the receiving groove. By this means in static operation good connective quality of the connection arrangement that comprises a multitude of rivets and/or threaded bolts is achieved. As a result of the distance between the borehole in the first component and the receiving groove and the borehole diameter the actuating force of the connection arrangement for the transition from normal static operation to the dynamic energy absorption mode can be precisely set.

According to a further embodiment a region of at least one guide groove, which region faces away from a borehole in a receiving groove of the first component, is of a conical design. As a result of the conical shape at the end of the guide groove, a steady increase in force can be achieved by increased jamming or by increased frictional force of the disc on the sidewalls of the groove. In this manner the hole-bearing failure can be steadily decelerated, and the introduction of abrupt stopping forces can be prevented.

In a further embodiment a depth of at least one guide groove and/or a depth of at least one receiving groove varies in some sections in the longitudinal direction of said grooves. As a result of this variation in the height profile or depth profile of the guide grooves and/or of the receiving grooves the energy-related absorption behavior of the connection arrangement, in particular its force-distance characteristics, can be set within wide limits.

In a favorable improvement of the connection arrangement the underlay devices comprise an approximately rectangular circumferential contour and in each case an underlay device hole for feeding the shafts of the connectors through said holes. By this means particularly reliable positional securing of the underlay devices in their respectively associated guide grooves is ensured. Apart from this, as a result of the underlay devices any pulling-through of the heads of the connectors in the case of high crash loads, and thus loss of integrity of the joined components, is prevented.

In a further embodiment of the connection arrangement a cross-sectional geometry of the underlay devices is rectangular, T-shaped or U-shaped. By this means an additional receiving volume for the material of the first component, which material is displaced by the shafts of the connectors, is created, and consequently it may be possible to do without the provision of a receiving groove.

In the case of a further embodiment at least one transverse side of an underlay device, which transverse side extends transversely to a guide groove, comprises a recess, in particular an approximately semi-circular recess. As a result of the front recess in the underlay device an additional volume is provided for receiving the laminate displaced by the shafts of the connectors in the dynamic energy absorption mode. The recess is preferably provided in that transverse side of the underlay device which transverse side is situated in the direction of movement of the underlay device during the hole-bearing process for energy absorption in the case of a crash.

In the case of a further advantageous embodiment of the connection arrangement according to the invention at least one connector is positioned in a shearing zone of the first component. By this means the flow of force after shearing-off of the connector from the margin-side laminate of the first component takes place exclusively by way of the remaining connectors, which initially still maintain a connection having a positive-locking fit between the components, which connectors in the further process then absorb mechanical energy in a defined manner as a result of hole-bearing failure. Consequently this makes possible more accurate triggering of the hole-bearing processes for the purpose of energy absorption.

In a further development of the connection arrangement the heads of the connectors in the shearing zone are in each case received in associated shearing grooves whose shearing groove ends facing away from their associated boreholes are open, wherein a material thickness in the region of the shearing grooves is reduced. By this means defined shearing of the connectors from the marginal laminate of the first component and thus at the same time precise initiation of the energy absorption by means of the subsequent hole-bearing failure are made possible. Preferably, the material thickness of the first component in the region of the shearing guide grooves is less than or equal to a material thickness of the first component in the region of the guide grooves and if applicable the receiving grooves provided therein.

According to a further embodiment it is provided that at least one shaft of a connector comprises a reduced diameter when compared to the diameters of the remaining connectors. By this means, when the critical mechanical threshold that has been pre-set in the design and construction has been reached, first the connectors with reduced shaft diameter when compared to that of the remaining connectors shear off. Subsequently, the force flow extends in turn exclusively by way of the connectors with the greater shaft diameter, wherein mechanical energy is absorbed as a result of hole-bearing failure. Preferably, the connectors with reduced shaft diameter are taken together to form a connector row or a connector matrix located in a marginal section of the first component.

Preferably, the reinforcement fiber orientation within the matrix of the at least one component is selected so that maximum energy absorption is achieved as a result of materials failure. By this means the energy absorption when exceeding the threshold load or in the case of a crash is further improved.

A structure according to the invention comprises at least two components that have been joined by means of a connection arrangement according to the invention. Such a structure features very considerable energy absorption in the joining region of the components. Examples of such structures are fuselage cell structures of aircraft, or automobile structural cells, for example in the connection region of a bumper.

BRIEF DESCRIPTION OF THE DRAWINGS

Below, preferred exemplary embodiments of the invention are explained in more detail with reference to considerably simplified diagrammatic illustrations. The following are shown.

Identical constructive elements in the drawings have the same reference characters.

DETAILED DESCRIPTION OF THE PREFERRED EMBODIMENTS

Figure 1:
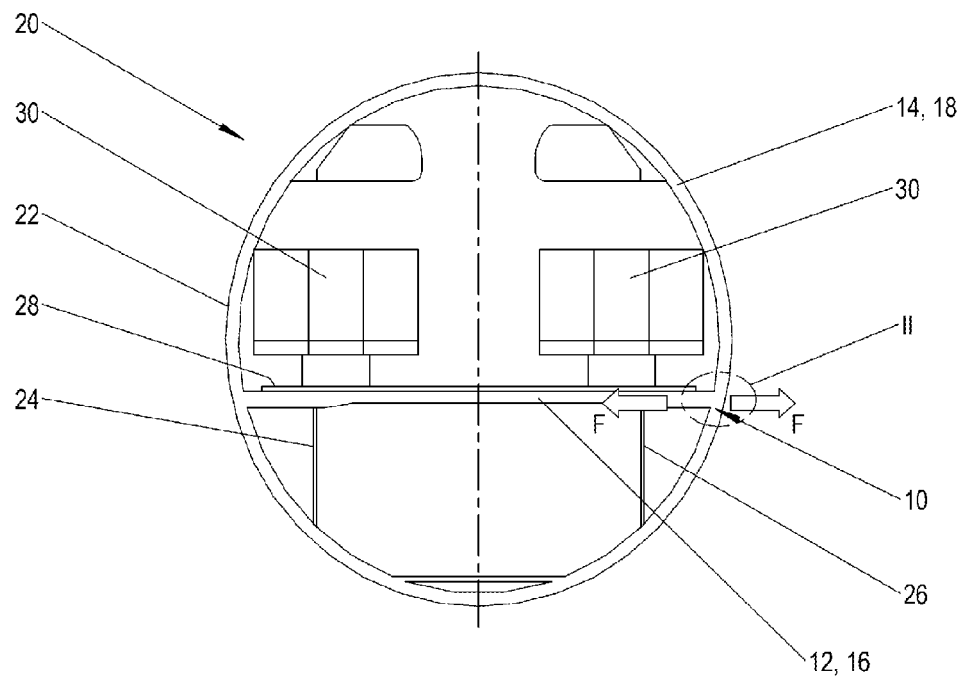
FIG. 1 is a diagrammatic cross-sectional view of a fuselage cell structure of an aircraft with a connection arrangement according to the invention.

FIG. 1 shows a diagrammatic cross-sectional view of a fuselage cell structure of an aircraft with a connection arrangement according an embodiment of to the invention.

By means of an energy-absorbing and thus largely crash-safe connection arrangement 10 a first and a second component 12, 14 are interconnected, which components 12, 14 in the diagram purely as an example are a transverse member 16 and a circular frame element 18 of a fuselage cell 20 of an aircraft (not shown). On the outside the circular frame element 18 comprises a fuselage cell skin 22, and the transverse member 16 together with two vertical struts 24, 26 is used to support a floor 28 on which several passenger seats 30 are arranged in rows.

In the case of a heavy crash, e.g., when the fuselage cell 20 hits a runway without the landing gear extended, or in the case of some other rapid mechanical deceleration of the fuselage cell 20, very substantial forces F act among other things on the transverse member 16 and the circular frame element 18 and thus on the connection arrangement 10. In such a crash case, for example a flight direction or movement direction of the aircraft extends approximately perpendicularly to the drawing plane.

Figure 2:
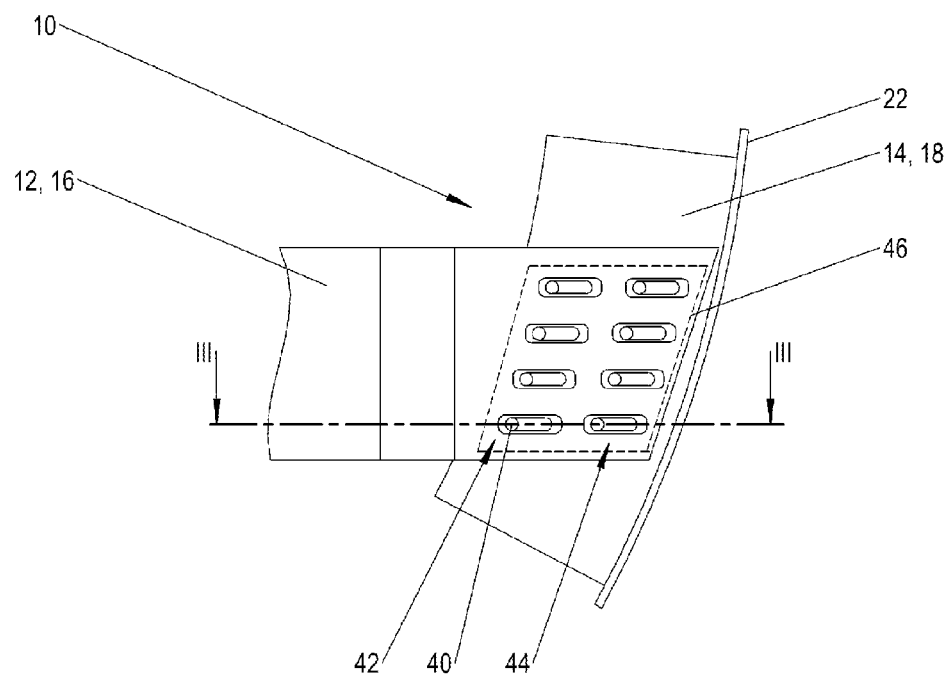
FIG. 2 is an enlarged view of the connection arrangement of FIG. 1.

FIG. 2 shows an enlarged view of the connection arrangement of FIG. 1.

The connection arrangement 10 comprises the first component 12 or the transverse member 16 and the second component 14 in the form of the circular frame element 18, wherein the components 12, 14 are joined by means of a multitude of connectors—of which only one connector, representative of the others, comprises the reference character 40. The connectors are arranged in a matrix shape, in the diagram as an example arranged in two parallel connector rows 42, 44, thus resulting in a connector field 46 or a connector matrix. The connectors have been formed from a suitable metallic material; they can, for example, be rivets or comprise threaded bolts and nuts (e.g., fastening system "High-Lock®"). In contrast to this, the components 12, 14 comprise a carbon-fiber reinforced plastic ("CFRP") material.

Figure 3:
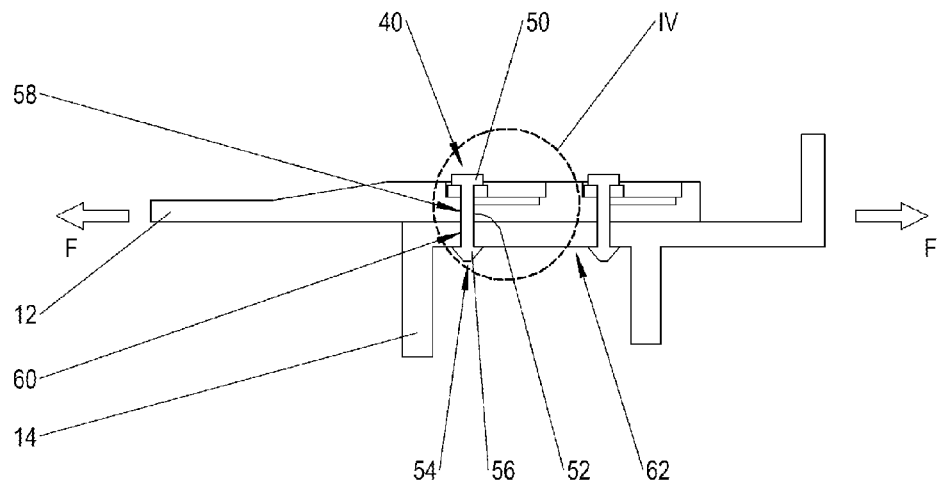
FIG. 3 is a cross section of the connection arrangement along the section line III-III in FIG. 2.

FIG. 3 shows a cross section of the connection arrangement along the section line III-III of FIG. 2.

The connector 40 for joining the components 12, 14 comprises a disc-shaped head 50 with a connected cylindrical shaft 52. On a shaft end 54 of the shaft 52, which shaft end 54 faces away from the head 50, a counter-bearing 56 is arranged. The shaft 52 of the connector 40 reaches through a borehole 58 in the first component 12 and through a borehole 60 in the second component 14, wherein the boreholes 58, 60 have been placed in the components 12, 14 so as to be aligned with each other. The counter-bearing 56 rests against an underside 62 of the second component 14. The structural design of the further connectors (compare in particular FIGS. 1 to 3) corresponds to the connector 40 presently described. Both the shaft 52 of the connector 40 and the boreholes 58, 60 can comprise a geometry that differs from the cylindrical or hollow-cylindrical shape; they can, for example, be conical in design.

Figure 4:
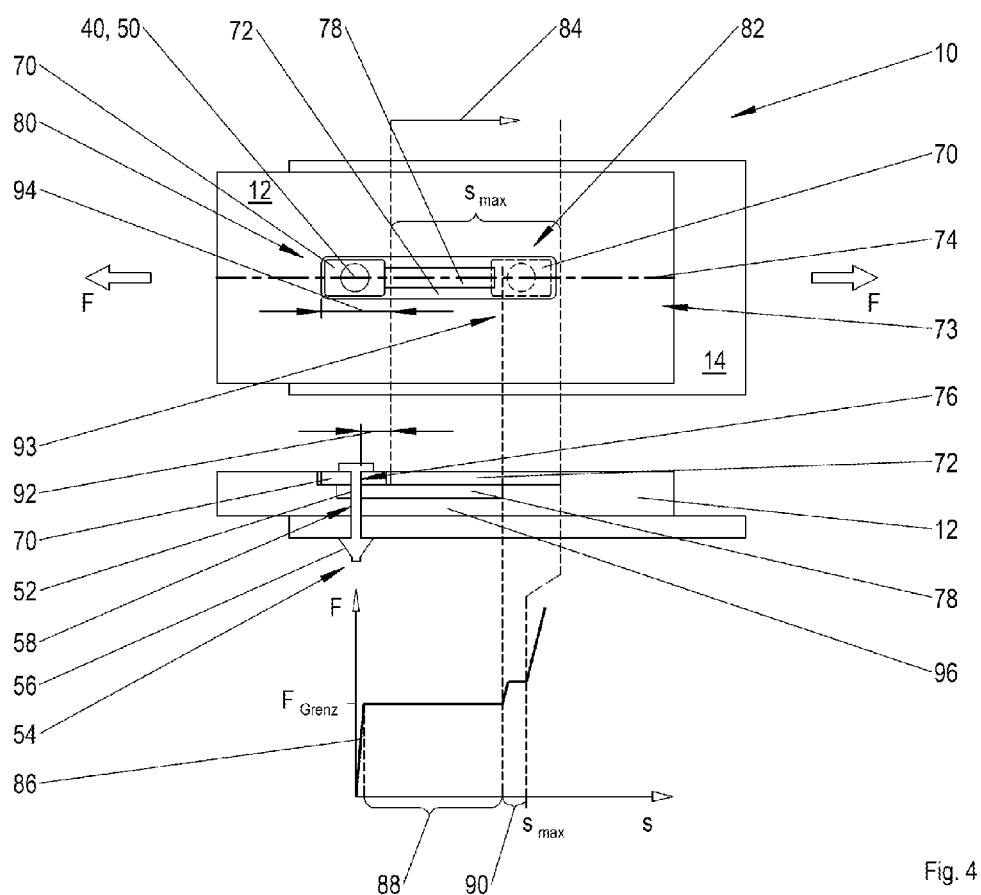
FIG. 4 is an enlarged top view of the section IV from FIG. 3 together with the associated longitudinal section of the connection arrangement, and an associated force-distance diagram.

FIG. 4 illustrates an enlarged top view of section IV of FIG. 3 together with the associated longitudinal section of the connection arrangement and an associated force-distance diagram to illustrate the basic functional principle of the energy-absorbing, crash-safe connection arrangement.

The head 50 of the connector 40 rests against an underlay device 70 or a washer with an approximately rectangular circumferential contour. The underlay device 70 is received in an essentially rectangular guide groove 72, which is embedded in a top 73 of the first component 12, so as to have positive fit at least in some regions and so as to be, in the case of a crash, axially displaceable along the longitudinal center axis 74 of said top 73. The longitudinal center axis 74 extends parallel to the principal load direction, along which the crash-induced forces F predominantly act. For the purpose of feeding-through the shaft 52 of the connector 40 a through-borehole 76 has been placed in the underlay device 70, and an optional receiving groove 78 has been embedded in the guide groove 72, which receiving groove 78 primarily serves to optimally receive the laminate of the first component 12, which laminate in the case of overload is displaced by the connector 40. The receiving groove 78 extends underneath the guide groove 72 and does not reach through the first component 12. The guide groove 72 and the optional receiving groove 78 extend along the longitudinal center axis 74 and thus parallel to the principal load direction. The guide groove and the receiving groove 72, 78 can, for example, be made in the laminate of the first component 12 by milling. The length (not indicated by a reference character) of the guide groove 72 is up to 100 mm, wherein the length of the receiving groove 78 is slightly shorter than that of the guide groove 72. In the normal static load case shown, or in the normal load bearing mode of the connection arrangement 10, the components 12, 14 are firmly braced together between the head 50 and the counter-bearing 56 affixed to the shaft end 54 of the shaft 52, as is the case with components joined by means of connectors.

For installation of the connection arrangement 10 the underlay device 70 is placed in the guide groove 72 prior to placement of the connector 40.

If the forces F exceed a threshold load Fthreshold, which forces predominantly act along the longitudinal center axis 74 on the connection arrangement 10, as can occur, for example, in the case of an aircraft landing on a runway without its landing gear extended, this results in the controlled hole-bearing failure, as intended according to the invention, of the borehole 58 in the first component 12. Consequently, the connection arrangement 10 makes a transition from the normal static load case to the dynamic energy absorption mode in which to a significant extent kinetic energy is absorbed so that the consequences of a serious crash are mitigated. In this process the connector 40, and with it the underlay device 70 received in the guide groove 72, moves, starting from its initial position, shown in the diagram, in a commencement 80 of the guide groove along the longitudinal center axis 74 until it has reached its end position (shown in dashed lines) in the region of an end 82 of the guide groove. During this process the underlay device 70, and with it the shaft 52 of the connector 40, overall travels the distance sMax in a direction 84 or in a movement direction that faces away from the borehole 58 in the first component 12. This means that the connector 40, and with it the underlay device 70, in the case of a crash, as part of the commencing and progressing hole-bearing failure of the borehole 58 in the first component 12, is axially displaced starting in the shown position from the region of commencement 80 of the guide groove to the end 82 of the guide groove. Correspondingly, the force F in the force-distance diagram also shown in FIG. 4, which force-distance diagram shows the gradient of the force F over the distance s of the underlay device 70 or of the connector 40, extends. In a first curve section 86 the connection arrangement 10 is in the normal static load case, in which the force F steeply increases without any appreciable change in the distance s. In a second curve section 88 the force F remains constant over the increasing distance s, because in this region the desired energy absorption occurs as a result of the hole-bearing failure, and the connection arrangement 10 has made a transition to the dynamic energy absorption mode. In a third curve section 90 the energy absorption as a result of the defined hole-bearing failure in the region of the borehole 58 in the first component 12 has been completed because the underlay device 70 together with the connector 40 has assumed its end position (shown in a dashed line) in the region of the end 82 of the guide groove so that the force F from this point onwards steeply increases while the distance s increases only to a limited extent. In this phase the connection arrangement 10 is in a so-called stopping mode in which the energy absorption almost abruptly ends as a result of continuing hole-bearing failure.

When hole-bearing failure commences, the underlay device 70 that slides in the guide groove 72 ensures that the direction of failure always extends along the longitudinal center axis 74, even if the acting force F proportionally comprises transverse force components that can act at an angle α of up to 30° relative to the longitudinal center axis 74. In such a constellation the underlay device 70 with one of its longitudinal sides (for the sake of clarity not indicated by a reference character) rests against a sidewall (also not indicated by a reference character) of the guide groove 72 and as a result of surface pressure provides a contact force that opposes the aforesaid transverse force, which contact force makes it possible to achieve the intended hole-bearing failure along the longitudinal center axis 74. Furthermore, the guide groove 72 defines the maximum distance sMax which the connector 40 can travel in the first component 12. When the underlay device 70 reaches the end 82 of the guide groove, the effective bearing surface abruptly increases as a result of the face of the underlay device 70 hitting the end 82 of the guide groove. The four rounded corners or the corners, designed in the manner of radii, of the underlay device 70 result in stable sliding, prevent any "digging in" and canting or tilting of the underlay device 70 within the guide groove 72. A length ratio of the longitudinal sides to the transverse sides of the underlay device 70 is preferably 2:1 such that also in relation to the longitudinal center axis 74 forces F acting at an angle α of up to 30° can reliably be taken up and energetically absorbed as a result of hole-bearing failure. In contrast to this, the underlay device 70 can also comprise a square circumferential contour or almost any desired circumferential contour that to a large extent differs from a rectangular or square circumferential contour.

Furthermore, the circumferential contour of the underlay device 70 and the geometry of the end 82 of the guide groove are designed in such a manner that when the end position of the guide groove 82 has been reached there is a positive-locking fit, at least in some regions, between the underlay device 70 and the end 82 of the guide groove. The same also applies to the commencement 80 of the guide groove.

Finally, the underlay device 70 prevents the head 50 of the connector 40 from pulling through the components 12, 14 when subjected to very considerable forces. The receiving groove 78 ensures orderly flowing or receiving of the material or laminate, which has been displaced by the connector 40, during progressing hole-bearing failure. The receiving groove 78 preferably extends within the guide groove 72, thus providing an adequate expansion volume to the displaced laminate, and thus a possibility of avoiding the hole-bearing connector 40.

A length (not indicated by a reference character) of the receiving groove 78 and a projection 92 of the underlay device 70 relative to a longitudinal center axis of the shaft 52 of the connector 40 are preferably designed so that the connector 40 reaches an end 93 of the receiving groove prior to the underlay device 70 hitting the end 82 of the guide groove. By this means a gradual, less abrupt, transition from the dynamic energy absorption mode or the hole-bearing failure to the stopping mode or to the deceleration mode takes place so that mechanical load peaks are prevented. In this diagram the projection 92 corresponds, for example, to half a length 94 of the underlay device 70. An asymmetric arrangement of the borehole 76 of the underlay device 70 relative to the longitudinal center axis 74 is also possible.

In the design and construction of the connection arrangement 10 care should be taken above all to achieving optimum matching between the laminate strengths of the components 12, 14 and the strength of the connectors so that hole-bearing failure of the borehole 58 in an ideal case takes place exclusively in the material web 96 extending underneath the receiving groove 78 in the component 12, and premature failure of the other connectors is prevented.

Basically, the connection arrangement 10 should not be interpreted as being a single-section joining of the two components 12, 14; instead, it can also comprise two-section or multi-section joining comprising more than two components. Furthermore, the composite fiber component 12 can comprise any direction of fiber extension or fiber orientation, wherein the reinforcement fibers can be embedded in any matrix comprising a suitable plastic material that is mechanically adequately strong. A reinforcement fiber orientation or a direction of fiber extension of the reinforcement fibers within the matrix of the component 12 can be selected so that in the case of a crash maximum energy absorption is achieved as a result of materials failure. In contrast to this, the component 14 comprises any metallic material, e.g., aluminum, titanium or stainless steel.

Figure 5:
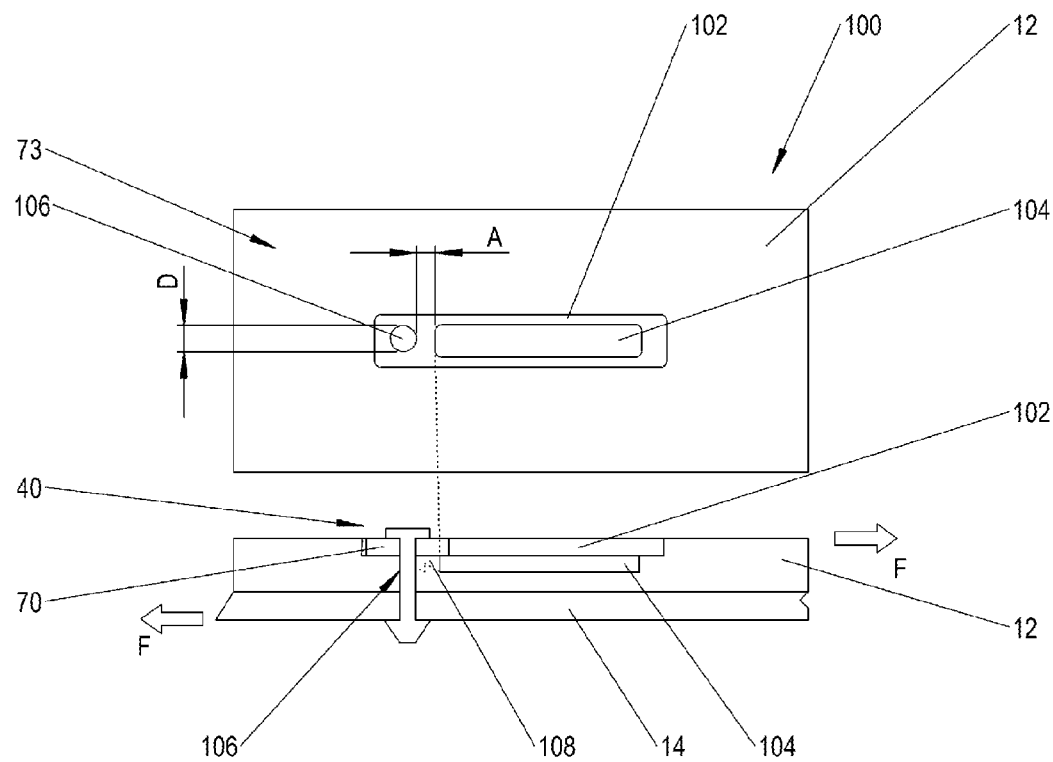
FIG. 5 is a top view and a longitudinal section of a connection arrangement with a borehole for the connector, which borehole is arranged outside the receiving groove.

FIG. 5 shows a top view and a longitudinal section of a connection arrangement with a borehole for the connector, which borehole is arranged outside the receiving groove.

The embodiment of the connection arrangement 100 comprises the two components 12, 14 that have been joined by means of the connector 40. A guide groove 102 is embedded in the top 73 of the first component 12, and a receiving groove 104 extends within said guide groove 102. In contrast to the embodiment of the connection arrangement 10 according to FIG. 4, a borehole 106 in the first component 12 is situated outside the receiving groove 104 of the first component 12, and consequently a step 108 results underneath the underlay device 70.

A ratio of a diameter D of the borehole 106 and the distance A of said borehole 106 to the receiving groove 104 is dimensioned so that if the force F in the case of a crash exceeds the threshold load Fthreshold, the step 108 of the first component 12 certainly shears off, and consequently reliable initiation of the subsequently automatically continuing hole-bearing failure of the borehole 106 is ensured.

During the process of the continuing hole-bearing failure the connector 40 is pulled through the first component 12 until it has reached the end (not indicated by a reference character) of the guide groove 102.

Figure 6:
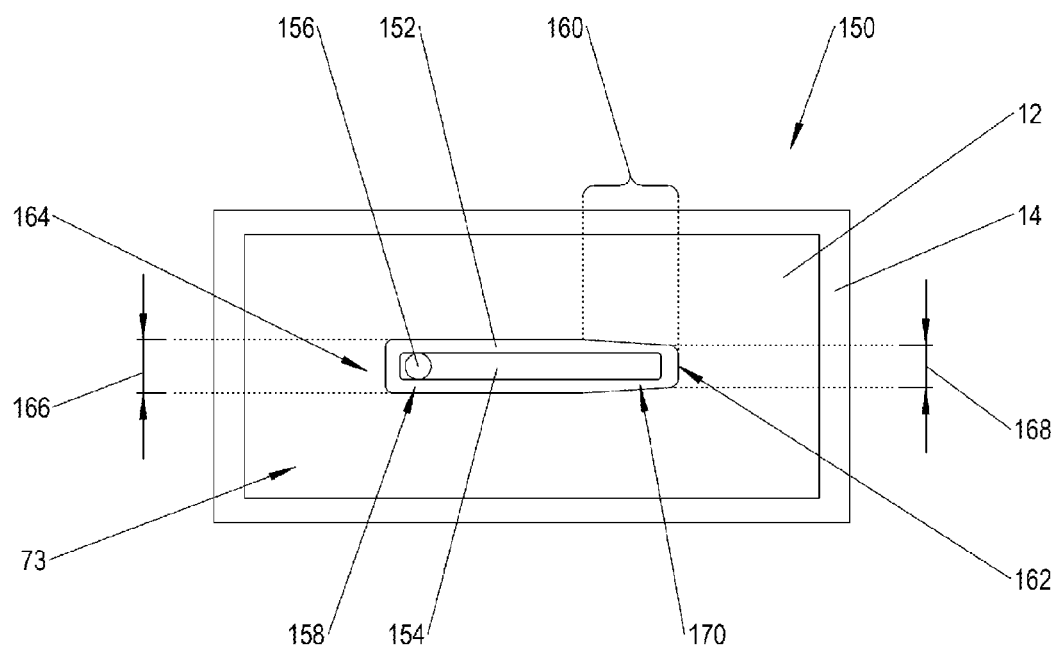
FIG. 6 is a top view of a guide groove of a connection arrangement with a slightly conical end of the guide groove.

FIG. 6 shows a top view of a guide groove with a slightly conical end of the guide groove. A connection arrangement 150 in turn comprises the joined components 12, 14 with a guide groove 152 embedded in the top 73 of the first component 12 and with a receiving groove 154 arranged therein.

In contrast to the embodiment of FIG. 5, in this embodiment the borehole 156 is not situated in the region of a commencement of the receiving groove 158 of the first component 12, and in a region 160 of an end of the guide groove 162, which end faces away from the borehole 156, the guide groove 152 is of a conical design. This means that a width 166 of the guide groove 152 in the region of commencement 164 of the guide groove within the conical region 160 tapers off, preferably in a linear manner, to a width 168 on one end 162 of the guide groove or in the region of an end 170 of the receiving groove.

By means of the guide groove 152 that is conical at its end, the force of the connector (not shown), which force acts against the movement of the connector during hole-bearing failure of the borehole 156, is increased by increasing jamming or by an increasing frictional force in the conical region 160. By this means, ending the hole-bearing failure takes place gradually and without any danger of load peaks occurring during the stopping process when the underlay device reaches the end of the guide groove 162.

Figure 7:
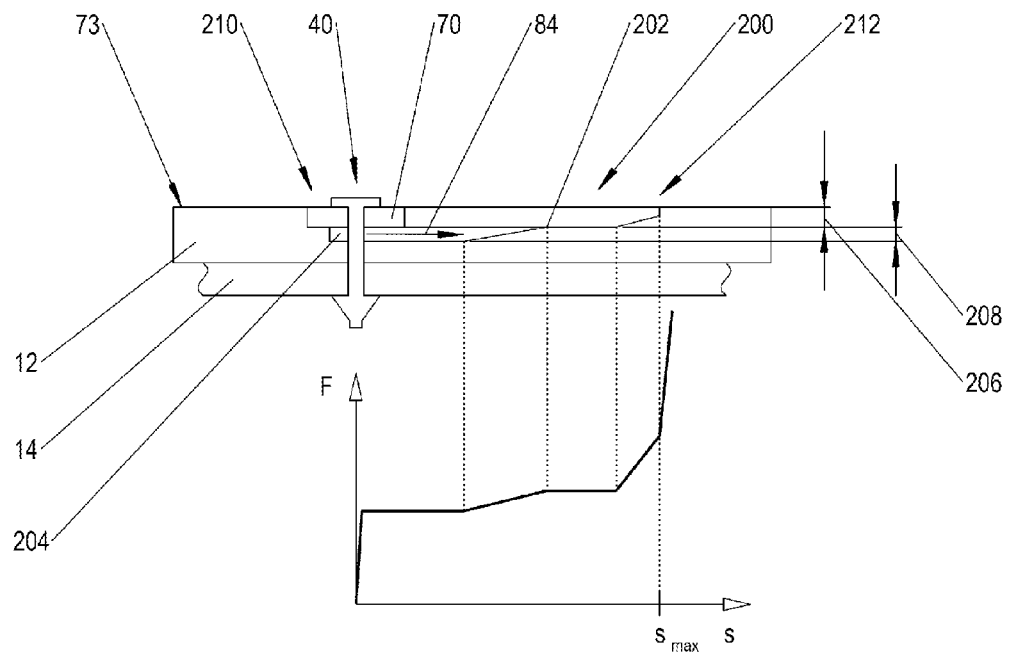
FIG. 7 is a longitudinal section of a guide groove with a receiving groove of a connection arrangement with a depth which in each case varies in some sections in the longitudinal direction, and an associated force-distance diagram.

FIG. 7 shows a longitudinal section of a guide groove with a receiving groove of a connection arrangement in each case with a depth that differs in sections in the longitudinal direction, and a simplified force-distance diagram that does not take into account any forward motion of the underlay device.

The connection arrangement 200 comprises the components 12, 14 joined by means of the connector 40. A guide groove 202 for the underlay device 70 and a receiving groove 204 are embedded in the region of the top 73 of the first component 12. A depth 206 of the guide groove 202 and a depth 208 of the receiving groove 204 in each case in sections decrease starting from the commencement 210 of the guide groove up to an end 212 of the guide groove.

By this means, as shown in the associated force-distance diagram, a constant gradient, or at least a gradient that rises in sections, of the force F over the distance s of the connector 40 arises until the underlay device 70, which slides in the direction 84, together with the connector 40 reaches the end of the guide groove 212 and has traveled the maximum possible distance sMax within the guide groove and the receiving groove 202, 204.

Figure 8:
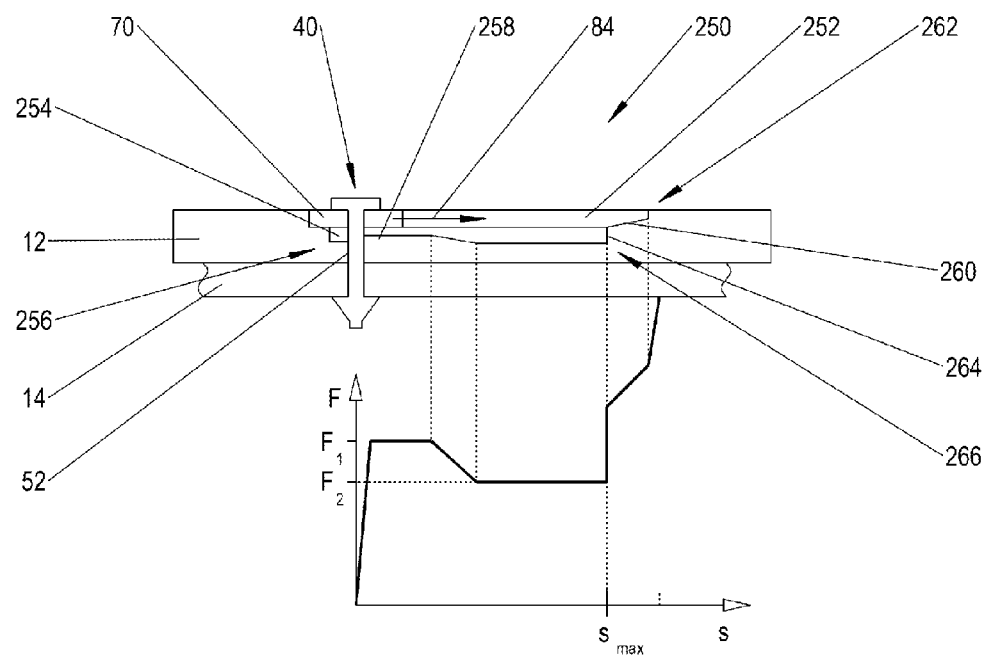
FIG. 8 is a longitudinal section of a guide groove with a receiving groove of a connection arrangement with a depth which in each case varies in some sections in the longitudinal direction, and an associated force-distance diagram.

FIG. 8 shows a longitudinal section of a guide groove with a receiving groove of a connection arrangement in each case with a depth that differs in sections in the longitudinal direction, and a simplified force-distance diagram that does not take into account any forward motion of the underlay device.

The connection arrangement 250 comprises the components 12, 14 joined by means of the connector 40 and by means of the underlay device 70 with a guide groove 252 and a receiving groove 254 in the first component 12. In the region of a commencement 256 of the receiving groove, a vertical step 258 is formed in its groove base. By this means, as shown in the associated force-distance diagram, a value F1 results in the progression of the force F that results from horizontal shearing-off of the vertical step 258, and that ensures reliable initiation of the hole-bearing failure in the first component 12.

After complete shearing-off of the vertical step 258, the connector 40 together with its underlay device 70 moves further in the direction 84, and the force F initially drops to a value F2 and in the further progression first remains constant on this level. After travelling the maximum distance sMax the underlay device 70 then runs against a conical step 260 on an end of the guide groove 262, and/or the shaft 52 of the connector 40 reaches a further vertical step 264 of an end 266 of the receiving groove so that the force F reaches a value F3 that is significantly greater when compared to F1. After the value F3 has been reached the force F and the distance s increase considerably.

FIGS. 7 and 8 illustrate the extensive scope of influencing the force-distance characteristics of the hole-bearing processes by means of varying the gradient of the height profiles or depth profiles of the groove bases of the guide grooves and of the receiving grooves 202, 204, 252, 254 in the first component 12.

Figure 9:
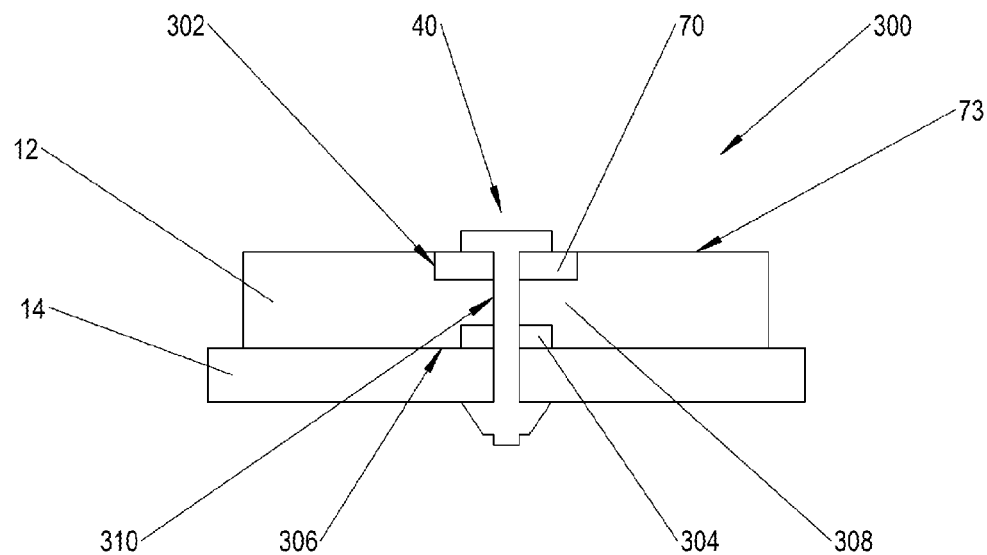
FIG. 9 is a cross section of a connection arrangement with a receiving groove formed on an underside of the first component.

FIG. 9 shows a cross section of a connection arrangement with a receiving groove formed on an underside of the first component. The connection arrangement 300 comprises the at least two components 12, 14, joined by means of the connector 40 and the underlay device 70, wherein in the top 73 a guide groove 302 is provided for receiving the underlay device 70 with positive-locking fit at least in some sections.

In a manner that differs from all the previous embodiments, a receiving groove 304 is embedded in an underside 306 of the first component 12, which underside 306 faces the second component 14. Between the guide groove and the receiving groove 302, 304 a material web 308 remains that extends perpendicularly to the drawing plane, which material web 308 comprises a borehole 310 for feeding the connector 40 through. The material web 308 with a rectangular cross-sectional geometry in each case forms the groove base for the guide groove and the receiving groove 302, 304.

Figure 10:
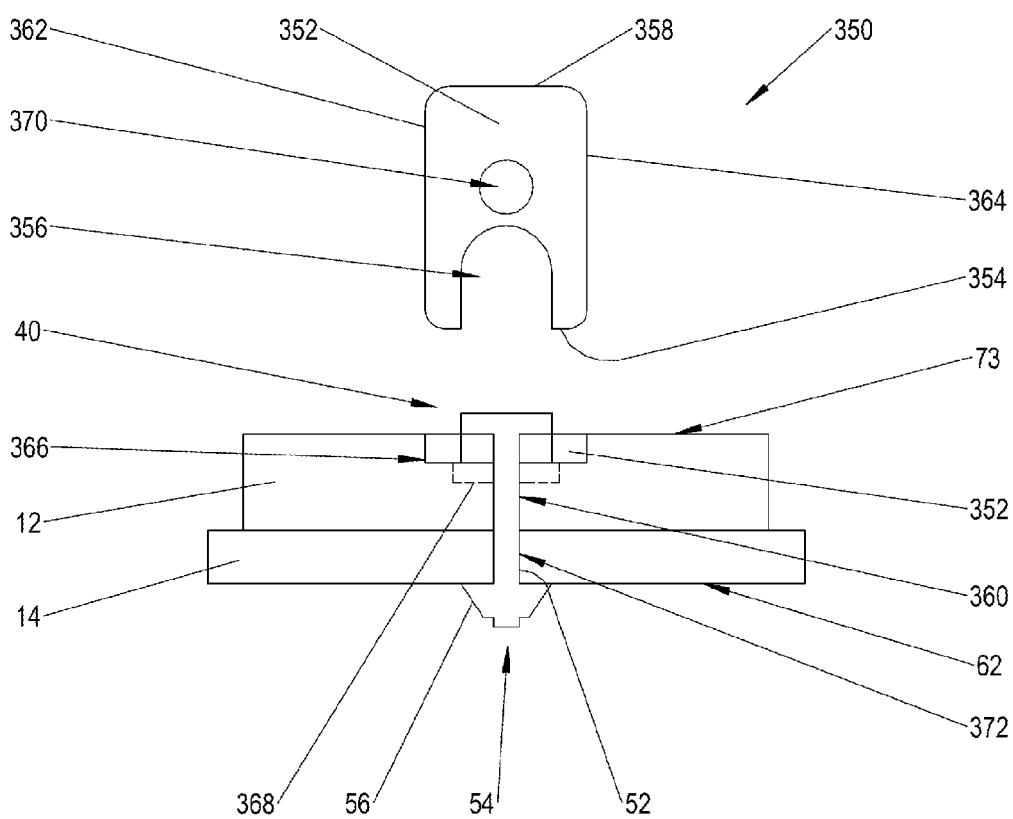
FIG. 10 is a top view of an underlay device with an approximately circular recess and a cross-sectional view of a connection arrangement equipped with it.

FIG. 10 shows a top view, from below, of an underlay device with an approximately circular recess, and a cross-sectional view of a connection arrangement comprising said underlay device.

This further embodiment of the connection arrangement 350 comprises the components 12, 14 joined by means of the connector 40 and of the underlay device 352. The counter-bearing 56 of the connector 40, which counter-bearing 56 is affixed to the shaft end 54 of the shaft 52, rests against the underside 62 of the second component 14.

In contrast to the preceding embodiments, the underlay device 352 with a likewise essentially rectangular circumferential contour or a cuboid shape, in the region of a transverse side 354 comprises a semi-oval or approximately semi-circular recess 356. In contrast to this, a transverse side 358 situated opposite the transverse side 354 and extending parallel to the aforesaid is of a continuous design. The recess 356 is used for optimally receiving laminate displaced by the shaft 52 of the connector 40 during the energy absorption as a result of hole-bearing failure of a borehole 360 in the first component 12. By means of its two longitudinal sides 362, 364 that extend parallel to each other, the underlay device 352 is guided within a guide groove 366 in the component 12. The approximately rectangular cross-sectional geometry of the guide groove 366 essentially corresponds to a likewise approximately rectangular cross-sectional geometry of the underlay device 352, so that the latter in an ideal case finishes off so as to be flush with the top 73 of the first component 12.

Underneath the guide groove 366 an optional receiving groove 368, indicated by a dotted line 368, can be provided when the space created by the recess 356 in the underlay device 352 is insufficient for receiving the displaced laminate or the fragments of the first component 12. A cylindrical borehole 370 in the underlay device 352 and a similar borehole 372 in the second component 14 together with the borehole 360 in the first component 12 serve to feed the shaft 52 of the connector 40 through the components 12, 14 or through the underlay device 352, wherein all three boreholes 360, 370, 372 are designed so as to be aligned with, and congruent to, each other.

Figure 11:
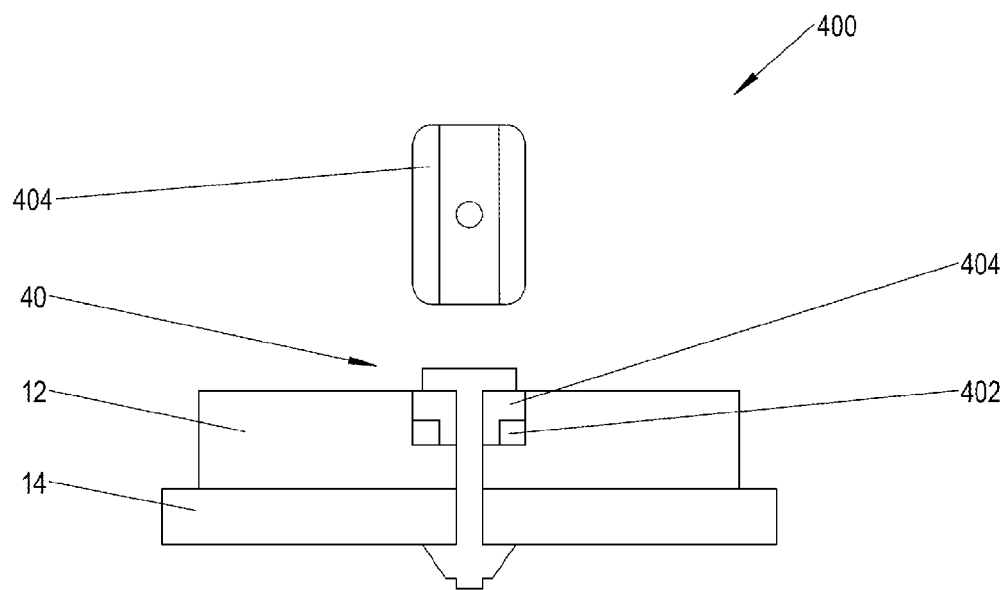
FIG. 11 is a view of an underlay device with a T-shaped cross-sectional geometry and a cross section of an associated connection arrangement without a receiving groove.

FIG. 11 shows a view of an underlay device with a T-shaped cross-sectional geometry, and a cross section of an associated connection arrangement without a receiving groove.

The connection arrangement 400 comprises the two components 12, 14 joined by means of the connector 40, wherein an underlay device 404, which is received in a guide groove 402 so as to be slidable perpendicularly to the drawing plain and flush with the component 12, comprises a T-shaped cross-sectional geometry for creating an additional volume for the laminate of the first component 12, which laminate has been displaced by the connector 40. By this means it may be possible, if appropriate, to do without a receiving groove for fragments or laminate of the first component 12, which receiving groove, for example, joins the guide groove 402 on the underside.

Figure 12:
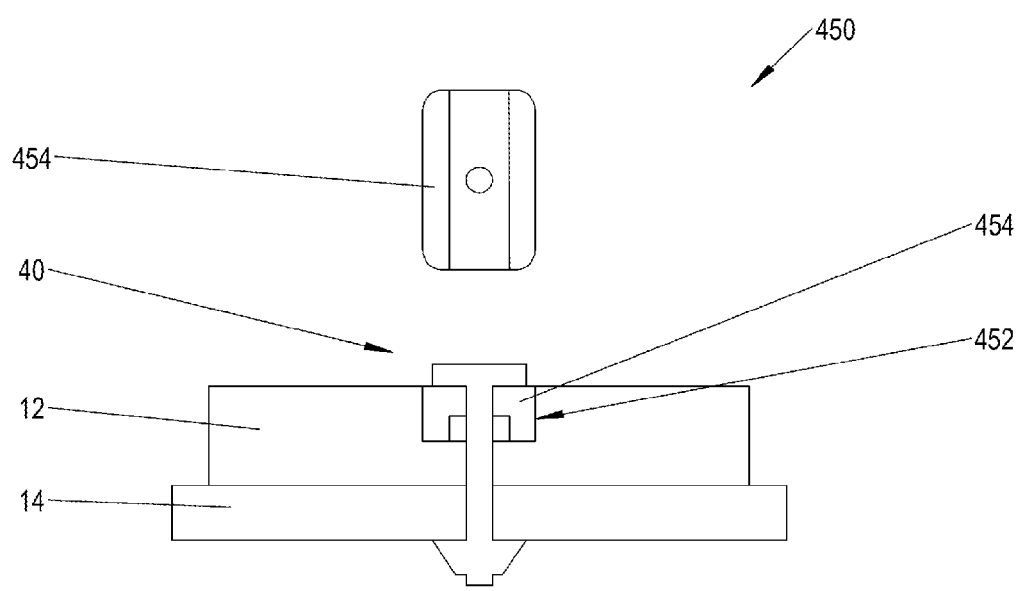
FIG. 12 is a view of an underlay device with a U-shaped cross-sectional geometry and a cross section of an associated connection arrangement without a receiving groove.

FIG. 12 shows a view of an underlay device with a U-shaped cross-sectional geometry, and a cross section of an associated connection arrangement without a receiving groove. The connection arrangement 450 comprises the two components 12, 14, joined by means of the connector 40, wherein an underlay device 454, which is received in a guide groove 452 so as to be slidable perpendicularly to the drawing plane and flush with the component 12, comprises a U-shaped cross-sectional geometry for creating an additional volume for the laminate of the first component 12, which laminate has been displaced by the connector 40. By this means it might be possible to do without a receiving groove for fragments or laminate of the first component 12, which receiving groove joins the guide groove 452 on the underside.

Figure 13:
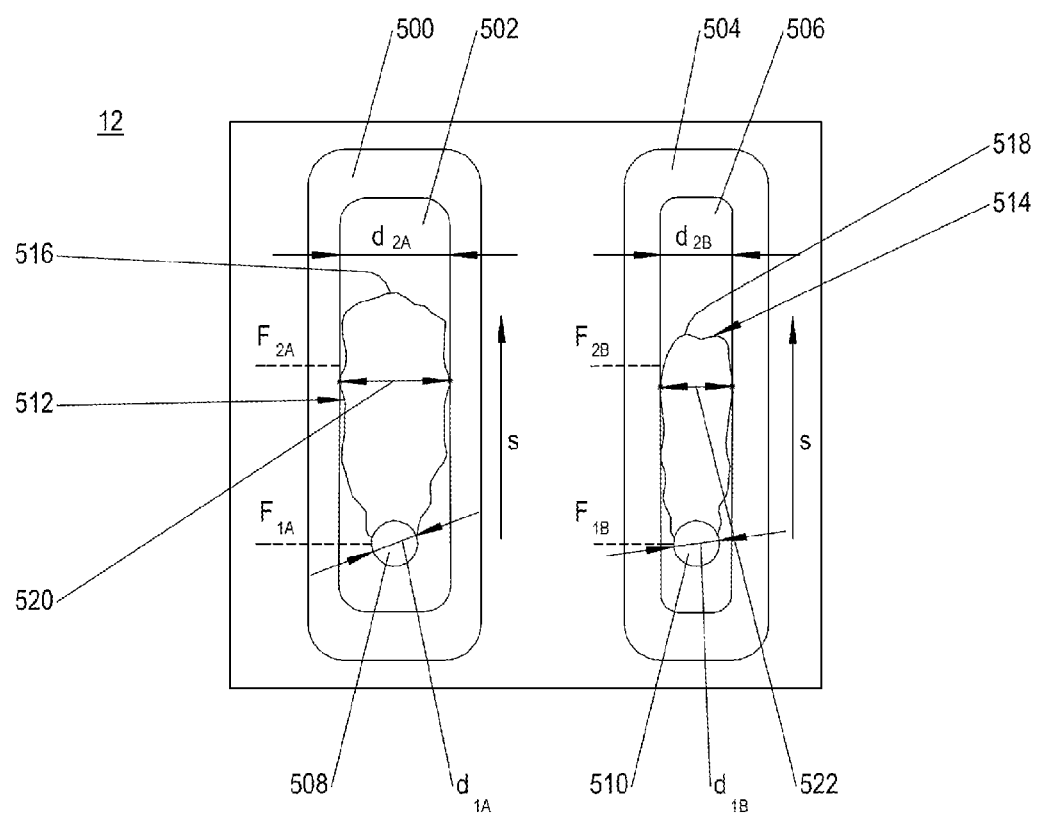
FIG. 13 shows two guide grooves each with an embedded receiving groove each with a different width.
Figure 14:
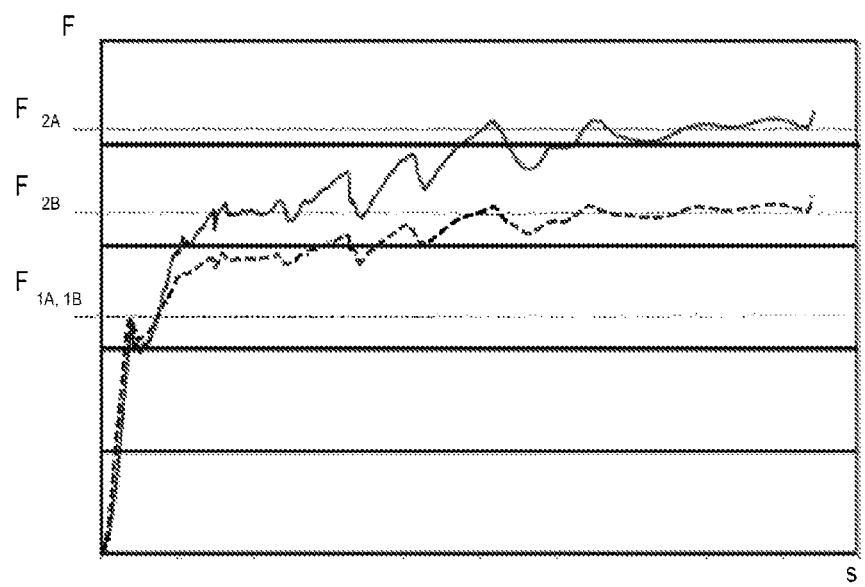
FIG. 14 is a force-distance diagram depending on the respective width of the receiving groove according to FIG. 13.

FIGS. 13 and 14, to which in the further course of the description reference is made together, show two guide grooves, each comprising a receiving groove embedded therein, each of a different width, and an associated force-distance diagram depending on the respective width of the receiving groove according to FIG. 13, with reference to which the targeted setting of the hole-bearing behavior is to be explained in more detail.

In the component 12 on the left-hand side a guide groove 500 with a receiving groove 502 and on the right-hand side a guide groove 504 with a receiving groove 506 are arranged. In each case the receiving grooves 502 and 506 comprise a borehole 508, 510 with an interior diameter d1A and d1B. For the sake of clarity the necessary connectors and the underlay devices including their shafts are not shown. In this arrangement the diameter d1A and 1B of the boreholes 508, 510 approximately correspond to the diameters of the shafts of the connectors (not shown), (light press fit). As is shown in the diagram of FIG. 14, the hole-bearing failure of the boreholes 508, 510 commences with the forces F1A and F1B, which are approximately identical.

In the case of increased hole-bearing lengths 512, 514 or hole circumferences the force F to be applied to move the connectors further through the component 12 slowly increases because the fragments displaced and/or upset by the connectors cause enlargement or widening of the hole bearings 516, 518. In the case of a distinctly continuous hole-bearing process the widths 520, 522 of the widened or frayed hole bearings 516, 518 can become twice as large as the diameters d1A, d1B of the associated boreholes 508, 510, as is the case in the diagram, for example, in the left-hand side 516. Consequently, in the case of a forced hole-bearing process the forces F2A, 2B can, for example, reach double the value when compared to the almost identical forces F1A, 1B during failure initiation (compare FIG. 14).

Consequently, by means of targeted priority-accorded variation of the widths d2A, d2B of the receiving grooves 502, 506 the maximum occurring widths 520, 522 of the hole bearings 516, 518 can be limited. In this design the greater laminate thickness outside the receiving grooves 502, 506 in the region of the guide grooves 500, 504 prevents the further, lateral, fraying or widening of the hole bearings 516, 518.

As a result of the priority-accorded variation of the two widths d2A and d2B of the receiving grooves 502, 506 the maximum occurring hole-bearing forces F2A and F2B can in each case be set to be lower or higher depending on the distance s of the connectors through the laminate of the first component 12, which is also illustrated in the diagram shown in FIG. 14, wherein at the same time the formulaic relationships F2A>F2B or d2A>d2B and F1A=F1B apply.

Figure 15:
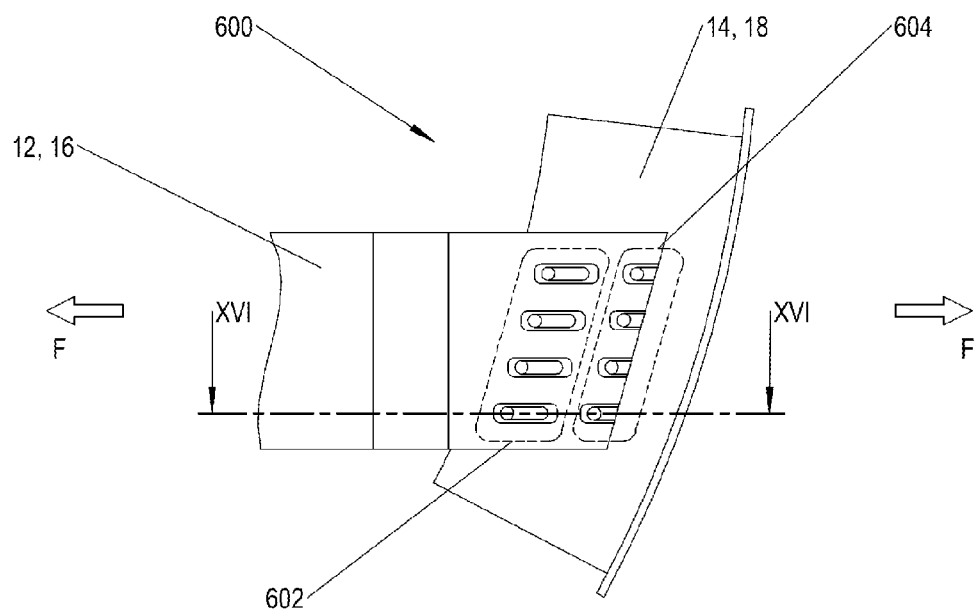
FIG. 15 is a top view of a connection arrangement with connectors in a marginal shearing zone of the first component.

FIG. 15 shows a top view of an embodiment of a connection arrangement with a multitude of connectors, arranged in a matrix-like or field-like manner, in a marginal, peripheral shearing zone of the first component.

The connection arrangement 600 again comprises the first component 12 or the transverse member 16 and the second component 14 in the form of the circular frame element 18. For example, a region 602 of the connection arrangement 600 comprises a multitude of connectors and underlay devices (not indicated individually by reference characters) which in each case are received in boreholes, guide grooves and receiving grooves, with the design and construction of the aforesaid in each case corresponding to the design of the connector, the boreholes, the underlay device, the guide groove and the receiving groove of the connection arrangement in FIG. 4.

Furthermore, the connection arrangement 600 in a peripheral shearing zone 604 comprises a multitude of connectors (not indicated individually by reference characters) that are positioned in guide grooves open on the side of the margin. This means that the guide grooves located in the shearing zone 604 are open at their ends of the guide groove, which ends respectively face the second component 14 or the circular frame element 18.

As a result of this design and construction variant, initiation of the connection arrangement 600 is further optimized as a result of laminate material shearing off within the shearing zone 604. Shearing-off of the laminate material in the shearing zone 604 takes place when the acting force F exceeds a value Fthreshold that has previously been determined in the design and construction. Subsequently, the energy absorption according to FIG. 4 again takes place by controlled hole-bearing failure of the boreholes and grooves of the connectors, which boreholes and grooves are situated within the region 602. In this context the value Fthreshold is equal to the value of an initial force (Finitial) for triggering controlled energy absorption by means of hole-bearing failure.

Figure 16:
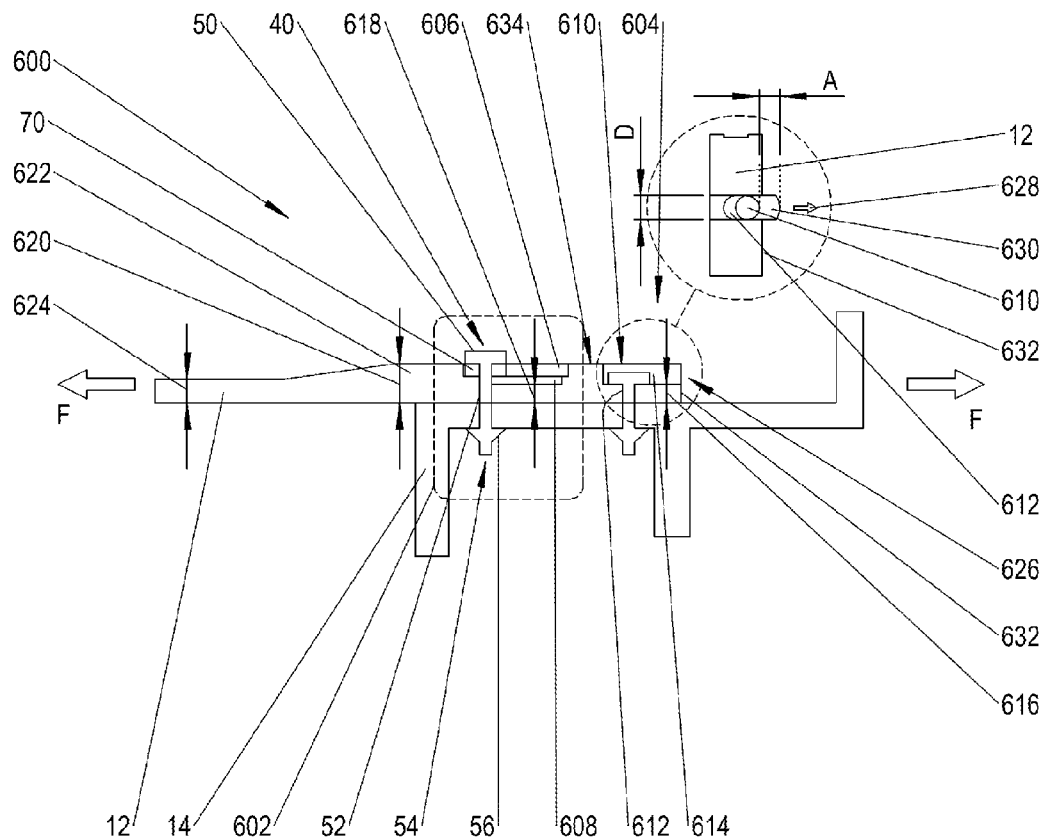
FIG. 16 is a longitudinal section of the connection arrangement along the section line XVI-XVI of FIG. 15.

FIG. 16 shows a longitudinal section of the connection arrangement along the section line XVI-XVI of FIG. 15.

The connector 40 with the head 50, with the shaft 52 and with the counter-bearing 56 attached to the shaft end 54 is situated within the region 602 of the connection arrangement 600, wherein in each case the connector 40 reaches through a borehole (not indicated by a reference character) in each of the joined components 12, 14. The head 50 of the connector 40 rests with an adequately high mechanical preload against the underlay device 70 which in turn is received in a guide groove 606 of the first component 12 with a receiving groove 608 extending underneath it. The design and the construction of these components follow, in particular, the design already explained in detail in the context of the description of FIG. 4.

In the shearing zone 604 there is a further connector 610, which likewise reaches through boreholes (not indicated by reference characters) in the components 12, 14, with the design and construction of said connector 610, apart from a shortened shaft length, corresponding to those of the connector 40. This further connector 610 is arranged in a borehole 612 incorporated in a shearing groove 614. In the region of the shearing groove 614 a material thickness 616 of the component 12 is less than or equal to a material thickness 618 of the component 12 in the region of the guide groove 606 or of the receiving groove 608, and less than a material thickness 620 in the region of a thickening 622 in the region of the connectors 40, 610 and a material thickness 624 outside the thickening 622 or outside the connectors 40, 610.

Furthermore, on a peripheral shearing groove end 626, in other words on an end facing away from the connector 610 or from the associated borehole 612, the shearing groove 614 is open in order to support at least resistance-reduced sliding along of the head of the second connector 610 in the case of a crash. When the force F exceeds a predetermined value Fthreshold, the shaft (not indicated by a reference character) of the connector 610 is pulled from the shearing groove 614 in the direction of a white arrow 628, wherein an approximately rectangular fragment 630 or displaced laminate shears from the component 12 or is pulled from said component 12. The value of this force Fthreshold can be set precisely and in a targeted manner by varying a borehole diameter D of the borehole 612 in the first component 12, and/or by varying a distance A of the borehole 612 from an outer edge 632 of the first component 12. In this embodiment the borehole 612 is arranged on a commencement 634 of the shearing groove, which commencement 634 faces away from the shearing groove end 626.

Subsequently, in the case of a crash, the desired energy absorption takes place, in the manner explained above, by means of a controlled hole-bearing failure of the borehole provided in the first component 12 for the connector 40. Generally speaking, the connection arrangement 600 is implemented with a multitude of connectors, underlay devices, guide grooves, receiving grooves and shearing grooves arranged in a matrix-shape or in a field-like manner.

Figure 17:
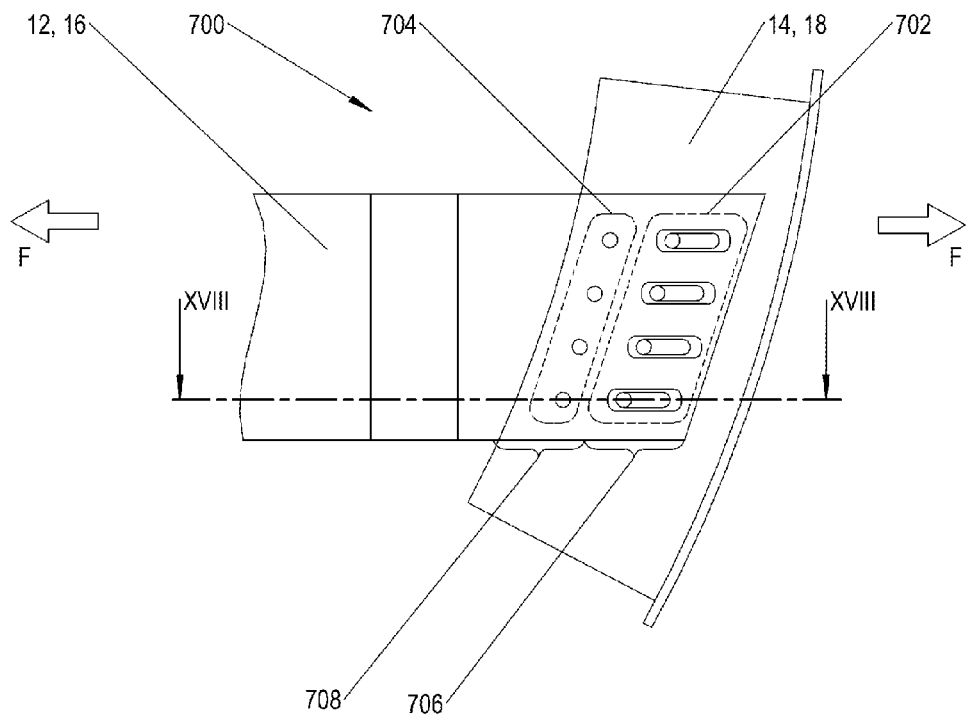
FIG. 17 is a top view of a connection arrangement with connectors of a reduced shaft diameter.

FIG. 17 shows a top view of an embodiment of a connection arrangement with a multitude of connectors, arranged in a matrix-like or field-like manner, with a reduced shaft diameter. The connection arrangement 700 comprises the first component 12 or the transverse member 16, and the second component 14 in the form of the circular frame element 18. A region 702 of the connection arrangement 700 comprises, for example, a multitude of connectors and underlay devices (not indicated individually by reference characters) which in each case are received in boreholes, guide grooves and receiving grooves, with the design and construction of the aforesaid in each case corresponding to the design of the connector, the boreholes, the underlay device, the guide groove and the receiving groove of the connection arrangement in FIG. 4.

Furthermore, the connection arrangement 700 in a shearing zone 704 comprises a multitude of connectors (not indicated individually by reference characters) that comprise a reduced shaft diameter when compared to the connectors in the region 702. The region 702 is preferably situated in a peripheral marginal zone 706 of the first component 12, while the shearing zone 704 is positioned in an inner zone 708 arranged on the inside on the component 12 and facing away from the marginal zone 706.

Because of this design, initiation of the connection arrangement 700 as a result of shearing-off of the connectors within the shearing zone 704 is further improved. Shearing-off of the shafts of the connectors within the shearing zone 704 takes place when the acting force F exceeds a value Fthreshold that has previously been determined in the design and construction. Subsequently, the energy absorption again takes place according to FIG. 4 by controlled hole-bearing failure of the boreholes and grooves of the connectors, which boreholes and grooves are situated within the region 702.

Figure 18:
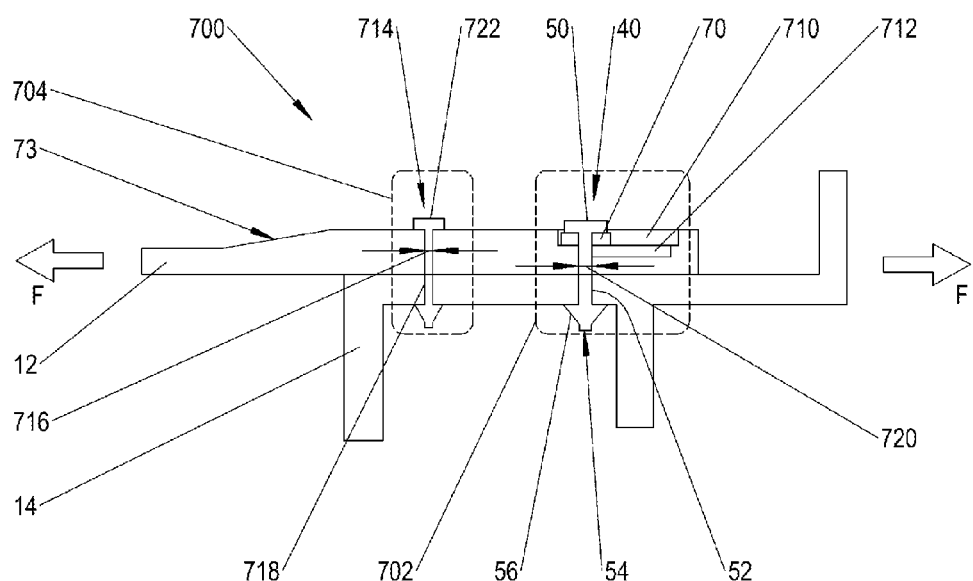
FIG. 18 is a longitudinal section of the connection arrangement along the section line XVIII-XVIII of FIG. 17.

FIG. 18 shows a longitudinal section of the connection arrangement along the section line XVIII-XVIII of FIG. 17.

The connector 40 with the head 50, with the shaft 52 and with the counter-bearing 56 attached to the shaft end 54 is situated within the region 702 of the connection arrangement 700, wherein in each case the connector 40 reaches through a cylindrical borehole (not indicated by a reference character) in each of the joined components 12, 14. The head 50 of the connector 40 rests with an adequately high mechanical preload, which acts in the direction of the shaft 52, against the underlay device 70 which in turn is received in a guide groove 710 of the first component 12 with a receiving groove 712 extending underneath it and in the case of a crash is slid longitudinally therein. The axial preload of the connector 40 is dimensioned in such a manner that in the normal static load case or in the load bearing mode the components 12, 14 are reliably interconnected with high connection quality. Moreover, the design and the construction of these components follow, in particular, the design already explained in detail in the context of the description of FIG. 4.

Within the shearing zone 704 there is a further connector 714 that also reaches through boreholes (not indicated by a reference character) in both components 12, 14, with the design and construction of said connector 714, apart from the shaft thickness and the counter-bearing matched to it, corresponding to that of the connector 40. A diameter 716 of a shaft 718 of the connector 714 is, however, dimensioned so as to be considerably smaller than a diameter 720 of the shaft 52 of the connector 40. Furthermore, an approximately cylindrical head 722 of the connector 714 rests without an underlay device directly against the top 73 of the component 12 that, furthermore, in the region of the shearing zone 704 does not have any guide grooves and receiving grooves and underlay devices. Furthermore, the first component 12 can comprise a thickening in the region of the connectors 40.

When the acting forces F, for example in the case of a crash, reach the value Fthreshold that has been determined in the design and construction, initially only the shaft 718 of the connector 714 is sheared off. Subsequently, controlled energy absorption takes place as a result of the controlled hole-bearing failure of the borehole provided for the connector 40 in the first component 12.

The value Fthreshold from which value onwards the shaft 718 of the connector 714 shears off, thus initiating or triggering the actual energy absorption process by controlled hole-bearing failure, among other things can be precisely set by means of the variation of the diameter 716.

In all the embodiments, for the purpose of energy absorption, the connection arrangement according to the invention uses the controlled hole-bearing failure of a multitude of boreholes of a connector field or of a connector matrix with a corresponding number of boreholes by means of hole-bearing processes, which occur parallel in time, with clearly defined boundary conditions by means of guide grooves and underlay devices, while at all times ensuring the structural integrity of the joined components. Controlled hole-bearing failure also takes place in non-parallel loads, also known as off-axis loads, which act at angles α of up to 30°, always in a predefined direction that essentially corresponds to the longitudinal center axis of the guide grooves and receiving grooves in one of the components. The hole-bearing failure is limited to a defined length, in particular to a length of the guide grooves and receiving grooves; in other words there is no uncontrolled pulling-out of the joined components, which could lead to a loss of the structural integrity. So-called head pull-through resistance, and the total loss of the structural integrity generally associated with it, and a blocking effect as a result of the banking up of displaced laminate material or of fragments are reliably prevented.

The connection arrangement further ensures precise setting of its force-distance behavior as a result of the multitude of available design parameters, which act independently of each other, while nevertheless representing a robust concept with a low degree of complexity. The connection arrangement makes it possible, for example, simply and economically to share the use of the connectors that are required anyway in a fuselage cell structure of an aircraft for the purpose of energy absorption without the need for design adaptations and increases in weight that are usually associated with such adaptations. The connection arrangement allows optimum utilization of the high mass-specific energy absorption capacity during hole-bearing failure of CFRP-components. The setting of the absorption characteristics of the connection arrangement, in particular their force-distance characteristics, is finely adjustable within wide limits by means of the multitude of different and individually settable design parameters, for example the height profile of the guide grooves and receiving grooves, their width, their cross-sectional geometry, the shaft diameters of the connectors, the shape of the underlay devices, etc.

The connection arrangement according to the invention for the crash-safe joining of fiber-reinforced plastic materials, in particular of CFRP-components, can advantageously be used in all fields of lightweight construction, in particular, however, in aircraft construction and vehicle construction.

The invention relates to an energy-absorbing connection arrangement for joining at least two components, in particular a transverse member and a circular frame element of a fuselage cell structure of an aircraft, with a multitude of connectors that are, in particular, arranged in a matrix-like manner, wherein each connector comprises a head with a shaft, and the shafts reach through associated boreholes in the components, and on the shaft ends facing away from the heads in each case counter-bearings are provided, and a first component comprising a fiber-reinforced plastic material and at least one further component comprising a metallic material and/or comprising a fiber-reinforced plastic material are formed. According to the invention, a head and/or a counter-bearing of at least one connector rests against at least one underlay device, and the at least one underlay device is received in at least one guide groove embedded at least in the first component, with the guide groove commencing in the region of the boreholes, wherein as a result of exceeding a mechanical threshold load Fthreshold the at least one underlay device is slidable in a direction facing away from the boreholes, and energy absorption takes place essentially along a longitudinal center axis of the at least one guide groove, in particular as a result of hole-bearing failure and/or shearing-off of the at least one component formed by means of the fiber-reinforced plastic material. Furthermore, the invention relates to a structure.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

LIST OF REFERENCE CHARACTERS

10 Connection arrangement
12 First component
14 Second component
16 Transverse member (first component)
18 Circular frame element (second component)
20 Fuselage cell
22 Fuselage cell skin
24 Vertical strut
26 Vertical strut
28 Floor
30 Passenger seat
40 Connector
42 Connector row
44 Connector row
46 Connector field
50 Head (connector)
52 Shaft (connector)
54 Shaft end (connector)
56 Counter-bearing (connector)
58 Borehole (first component)
60 Borehole (second component)
62 Underside (second component)
70 Underlay device
72 Guide groove
73 Top (first component)
74 Longitudinal center axis (guide groove)
76 Borehole (underlay device)
78 Receiving groove
80 Commencement of the guide groove
82 End of the guide groove
84 Direction (underlay device)
86 First curve section
88 Second curve section
90 Third curve section
92 Projection (underlay device)
93 End of the receiving groove
94 Length (underlay device)
96 Material web (receiving groove)
100 Connection arrangement
102 Guide groove
104 Receiving groove
106 Borehole (first component)
108 Step
D Diameter
A Distance
150 Connection arrangement
152 Guide groove
154 Receiving groove
156 Borehole
158 Commencement of the receiving groove
160 Region (conical)
162 End of the guide groove
164 Commencement of the guide groove
166 Width (commencement of the guide groove)
168 Width (end of the guide groove)
170 End of the receiving groove
200 Connection arrangement
202 Guide groove
204 Receiving groove
206 Depth (guide groove)
208 Depth (receiving groove)
210 Commencement of the guide groove
212 End of the guide groove
250 Connection arrangement
252 Guide groove
254 Receiving groove
256 Commencement of the receiving groove
258 Step (receiving groove)
260 Conical step (guide groove)
262 End of the guide groove
264 Step (receiving groove)
266 End of the receiving groove
300 Connection arrangement
302 Guide groove
304 Receiving groove
306 Underside (first component)
308 Material web
310 Borehole
350 Connection arrangement
352 Underlay device
354 Transverse side (underlay device)
356 Recess (semi-circular)
358 Transverse side (underlay device)
360 Borehole (first component)
362 Longitudinal side (underlay device)
364 Longitudinal side (underlay device)
366 Guide groove
368 Receiving groove
370 Borehole (underlay device)
372 Borehole (second component)
400 Connection arrangement
402 Guide groove
404 Underlay device
450 Connection arrangement
452 Guide groove
454 Underlay device
500 Guide groove
502 Receiving groove
504 Guide groove
506 Receiving groove
508 Borehole
510 Borehole
512 Hole-bearing length
514 Hole-bearing length
516 Hole bearing
518 Hole bearing
520 Width (hole bearing)

522 Width (hole bearing)
600 Connection arrangement
602 Region (hole-bearing failure)
604 Shearing zone
606 Guide groove
608 Receiving groove
610 Connector
612 Borehole (first component)
614 Shearing groove
616 Material strength (shearing groove)
618 Material strength (guide groove/receiving groove)
620 Material strength (thickening)
622 Thickening (first component)
624 Material strength
626 Shearing groove end
628 White arrow
630 Fragment (laminate)
632 Outer edge (shearing zone)
634 Commencement of the shearing groove
700 Connection arrangement
702 Region (hole-bearing failure)
704 Shearing zone
706 Marginal zone (first component)
708 Inner zone (first component)
710 Guide groove
712 Receiving groove
714 Connector
716 Diameter (thin shaft)
718 Shaft (thin)
720 Diameter (thick)
722 Head (connector)

The invention claimed is:

1. An energy-absorbing connection arrangement for joining at least two components, comprising:
   a multitude of connectors, wherein each connector comprises a head with a shaft, and the shafts reach through associated boreholes in the components,
   counter-bearings located on ends of the shafts facing away from the heads,
   a first of the components comprising a fiber-reinforced plastic material and at least one further component comprising at least one of a metallic material and a fiber-reinforced plastic material,
   at least one of the heads and the counter-bearings of at least one of the connectors resting against at least one underlay device,
   the at least one underlay device being received in at least one guide groove embedded at least in the first component, and
   a commencement of the guide groove being in a region of the boreholes,
   wherein as a result of exceeding a mechanical threshold load, the at least one underlay device is slidable in a direction facing away from the boreholes, and energy absorption takes place essentially along a longitudinal center axis of the at least one guide groove.

2. The connection arrangement according to claim 1, wherein the underlay device is arranged to be slidable as a result of at least one of hole-bearing failure and shearing-off of the at least one component formed of fiber-reinforced plastic material.

3. The connection arrangement according to claim 1, wherein the two components comprise a transverse member and a circular frame element of a fuselage cell structure of an aircraft.

4. The connection arrangement according to claim 1, wherein the connectors are arranged in a matrix-like manner.

5. The connection arrangement according to claim 1, wherein the connectors comprise at least one of rivets and threaded bolts with nuts as counter-bearings.

6. The connection arrangement according to claim 1, wherein the underlay devices comprise an approximately rectangular circumferential contour and in each case an underlay device hole for feeding the shafts of the connectors through said holes.

7. The connection arrangement according to claim 1, wherein a cross-sectional geometry of the underlay devices is one of rectangular, T-shaped and U-shaped.

8. The connection arrangement according to claim 1, wherein at least one shaft of a connector comprises a reduced diameter when compared to the diameters of the remaining connectors.

9. The connection arrangement according to claim 1, wherein the reinforcement fiber orientation within the matrix of the at least one component is selected so that maximum energy absorption is achieved as a result of materials failure.

10. The connection arrangement according to claim 1, wherein a receiving groove is embedded, in a region of the guide groove, in at least one of the at least one guide groove and the region of an underside of the first component, which underside faces the second component.

11. The connection arrangement according to claim 10, wherein at least one connector is positioned outside the receiving groove.

12. The connection arrangement according to claim 10, wherein a region of at least one guide groove, which region faces away from a borehole in a receiving groove of the first component, is conical.

13. The connection arrangement according to claim 10, wherein a depth of at least one of at least one guide groove and at least one receiving groove varies in some sections in a longitudinal direction of said grooves.

14. The connection arrangement according to claim 1, wherein at least one transverse side of an underlay device, which transverse side extends transversely to a guide groove, comprises a recess.

15. The connection arrangement according to claim 14, wherein the recess comprises an approximately semi-circular recess.

16. The connection arrangement according to claim 1, wherein at least one connector is positioned in a shearing zone of the first component.

17. The connection arrangement according to claim 16, wherein the heads of the connectors in the shearing zone are each received in associated shearing grooves whose shearing groove ends facing away from their associated boreholes are open, wherein a material thickness in the region of the shearing grooves is reduced.

18. A structure comprising at least two components that have been joined by means of an energy-absorbing connection arrangement, comprising:
   a multitude of connectors, wherein each connector comprises a head with a shaft, and the shafts reach through associated boreholes in the components,
   counter-bearings located on ends of the shafts facing away from the heads,
   a first of the components comprising a fiber-reinforced plastic material and at least one further component comprising at least one of a metallic material and a fiber-reinforced plastic material,
   at least one of the heads and the counter-bearings of at least one of the connectors resting against at least one underlay device, the at least one underlay device being received in at least one guide groove embedded at least in the first component, and
a commencement of the guide groove being in a region of the boreholes,
wherein as a result of exceeding a mechanical threshold load, the at least one underlay device is slidable in a direction facing away from the boreholes, and energy absorption takes place essentially along a longitudinal center axis of the at least one guide groove.

* * * * *